Nov. 12, 1968 F. H. REES 3,411,107

ELECTRICAL OSCILLATION GENERATORS

Filed Feb. 8, 1967 2 Sheets-Sheet 1

United States Patent Office 3,411,107

Patented Nov. 12, 1968

3,411,107

ELECTRICAL OSCILLATION GENERATORS

Frederick Henry Rees, London, England, assignor to International Standard Electric Corporation, New York, N.Y., a corporation of Delaware Filed Feb. 8, 1967, Ser. No. 614,746
Claims priority, application Great Britain, Feb. 11, 1966, 6,091/66
14 Claims. (Cl. 331—111)

ABSTRACT OF THE DISCLOSURE

An oscillator is provided with a delay line cyclically fed from at least one pulse driven monostable device. When an output of the monostable device reaches a certain point in the delay line, a signal is fed back to trigger the next cycle. To provide greater stability and accuracy, a number of circuits are connected in parallel to provide a "majority decision" circuit.

The present invention relates to an electrical oscillation generating circuit.

According to the present invention there is provided an electrical oscillation generating circuit, which includes a pulse generator which when triggered delivers an output pulse, a delay line whose input is fed from the output of said pulse generator, which delay line introduces a delay at least equal to the duration of a pulse from said generator, a connection from a tap on said delay line which, when a pulse in said delay line reaches said tap terminates the pulse input to the delay line, the time the pulse takes to reach said tap as it travels along said line being less than the duration of a pulse from said generator, so that the position of said tap determines the duration of the pulse which leaves said delay line, a feedback connection from the output of said delay line via which the pulse leaving said delay line triggers said generator to initiate the production of the next pulse from the circuit, and an output connection from the circuit.

Embodiments of the invention will now be described with reference to the accompanying drawings, in which.

*General introduction*

The oscillation generating circuit to be described is intended as the basic element of a pulse generation circuit designed to produce the controlling clock pulses for a large electronic system such as a computer or an electronically controlled telephone exchange.

The basic circuit is a closed-loop delay line type oscillator which includes a monostable circuit which feeds a delay line via an amplifier. Each pulse generated by the monostable is fed into the delay line and is propagated therealong. When in the course of its propagation it reaches a tap on the line it is applied therefrom to cut off the pulse supply to the delay line by resetting the monostable. Thus a pulse of a defined duration is caused to travel along the delay line. When this pulse leaves the delay line it is fed back via a buffer amplifier to the input of the loop to re-operate the monostable to initiate the generation of the next pulse. The buffer amplifier output also provides the output of the loop.

In the circuit referred to above for generating controlling clock pulses, four such units are used, three being master units and one being a slave unit. The latter does not have its buffer amplifier output connected to its input. Each of the units has at its input end a majority decision circuit with three inputs fed from the three master units and one output to the monostable. The majority decision unit does a two-out-of-three decision operation on the inputs to it to derive an output to switch the monostable.

The outputs from the four oscillator units are combined using majority logic techniques to provide pulse supplies to various elements of the controlled equipment. These include various elements such as ring counters to derive staggered pulse trains.

*The multi-unit oscillation generator (FIG. 1)*

Figure 1:
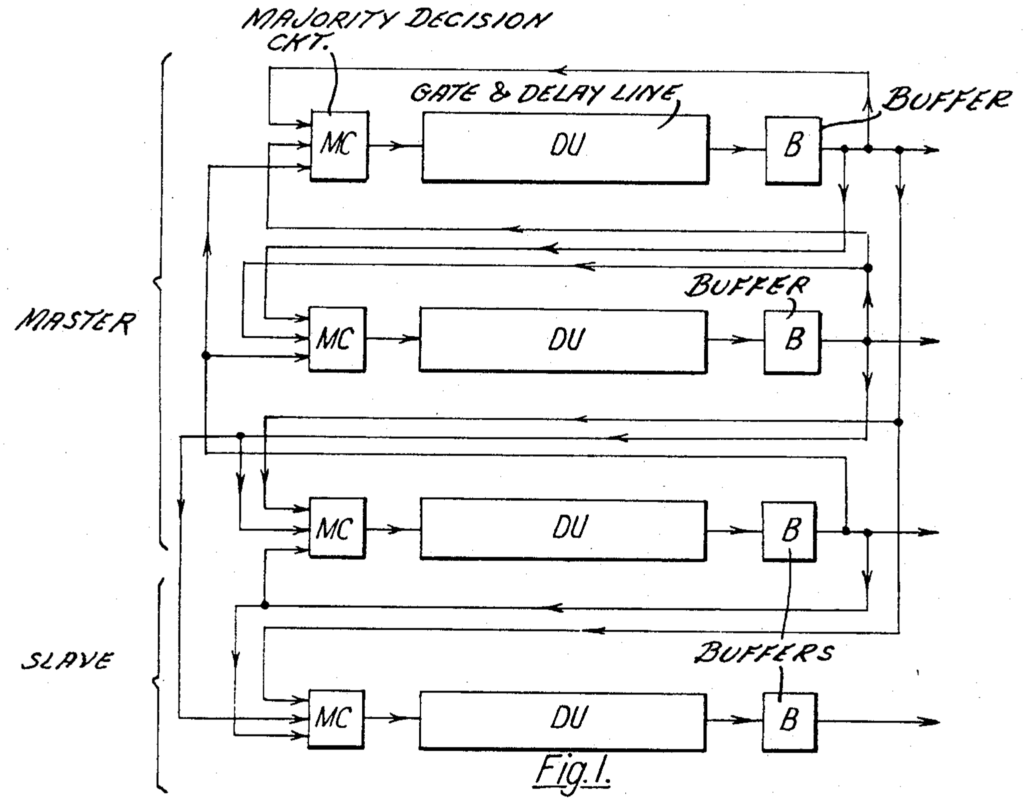
FIG. 1 shows schematically an oscillation generating arrangement using three master units and one slave unit, each of which is an oscillation generating circuit according to the present invention.

FIG. 1 is purely schematic, and for each of the three master units and one slave unit there is shown a two-out-of-three majority decision circuit MC, this having three inputs, one from each master unit. The majority decision circuits each feed a block DU which includes the monostable and the delay line, and each block DU feeds a buffer B, which provides its unit's output. Each buffer of a master unit—the uppermost three units in FIG. 1—feeds one input of each of the three master and one slave units, but the buffer of the slave unit—the bottommost unit in FIG. 1—does not feed any of the majority decision circuits MC.

Pulse distribution to the controlled circuitry can be effected in various ways. In one form the pulses are amplified to the necessary power level before distribution by buffers each fed with two nominally identical pulse trains from two of the units shown in FIG. 1. The two inputs are combined in AND-gate manner, so that the output is the logical product of the two inputs. If there is a fault in one input, then the output is either correct or part of the correct output, or no ouput. The four units' outputs, taken in pairs (AB and CD) in this way give two nominally identical outputs which are combined at the controlled equipment by OR gates and buffers. Since one fault results in either the correct output, part of a correct output, or no output, the OR gate, if functioning correctly will give a correct output for any single fault. The OR gates feed security checking equipment, and the distribution can be checked, either automatically at intervals or manually, by inhibiting one of the two distribution operations and noting the result. The AND condition at the pulse generation end of the system is, however, checked automatically.

In another method of pulse distribution, the outputs from the four oscillator units of FIG. 1 are distributed to the user circuits and checking attended to thereat as required.

*The closed-loop oscillatory circuit (FIG. 2)*

This includes the majority decision circuit MC, which for the time being will be ignored.

The loop includes two monostable circuits MS1 and MS2 in series, of which MS2 is the one mentioned above. When MS1 is triggered its output pulse immediately triggers MS2, and MS1 remains in its triggered condition for a period longer than the width of the pulse to be generated. In this case it remains in its "on" condition for approximately 4.5 micro-secs, and during that period it protects the second monostable from any spurious pulses.

The output from MS2 is applied via an amplifier AMP to the input of a delay line DL as a negative-going pulse. This pulse therefore travels along the line DL, and when it reaches the tap T it resets MS2, thus defining the duration of the pulse to be generated. In the present case this duration is 2.7 microsecs. It will be seen that the monostable MS2 is thus used effectively as a bistable, so that in fact one could use a bistable instead of a monostable for MS2.

Figure 2:
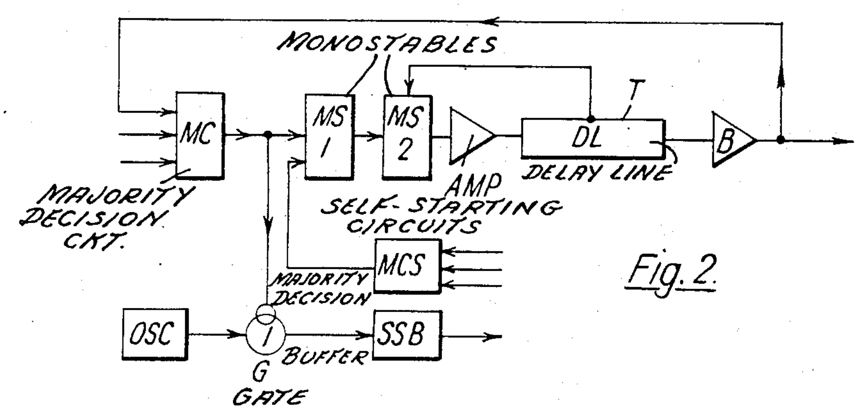
FIG. 2 is a first embodiment of the present invention shown in somewhat more detail than in FIG. 1.

The delay line DL has a second tap, in this case at the 6 microsec. point, indicated in FIG. 2 by its output to the buffer B, which latter re-shapes and amplifies the pulse to correct the degradation which it has suffered in the delay line DL. The output from the buffer forms the circuit's output, and also one of the three inputs to the majority decision circuit MC. The latter, as already mentioned, has three inputs one from each of the master units' buffers. When two of the inputs to MC go negative—the buffer outputs are negative pulses—MC gives an output to trigger MS1. Since the same waveforms are fed to all four majority decision circuits, all four units are operating in synchronism. The duplicated arrangement of the monostables prevents any harmonic or spurious oscillations from taking place.

It will be appreciated that, although the circuit will run continuously when started it will not start of its own accord, so FIG. 2 includes a self-start circuit. This is needed to give an initial start, or a re-start if some failure such as a power failure stops all levels of the equipment. The self-start circuit starts all master levels together, thus avoiding spurious initial pulses.

Each unit of FIG. 1 has a self-start majority decision circuit MCS (FIG. 2), which is fed by waveforms from the self-start circuits of the three master units, the output of each circuit MCS forming an alternative triggering input to its unit's first monostable MS1. In each master level the self-start waveform comes from a free-running oscillator OSC from which it is applied via a gate G to a buffer SSB, this latter feeding the circuits such as MCS in all four units. These oscillators are not synchronised and may even run at different frequencies.

The first output from a circuit such as MC closes the gate G, and thus the self-start circuits are disabled.

*Monostable circuits*

Each of the monostable circuits is a fairly conventional transistorised circuit of the cross-coupled type, the coupling between the transistor which is on in the triggered condition and the other transistor including a capacitor to time the restoration of the circuit to its rest condition. The coupling the other way is a direct-current coupling.

The triggering input switches off the transistor on in the rest condition, and switches on the other transistor, the input from DL (in the case of MS2) having the reverse effect.

As already mentioned, MS2 could be a bistable circuit as the manner in which it is used simulates a bistable. However, the advantage of a monostable is that in the event of a fault which breaks the loop, MS2 inevitably returns to rest by the time the fault is dealth with.

Figure 3:
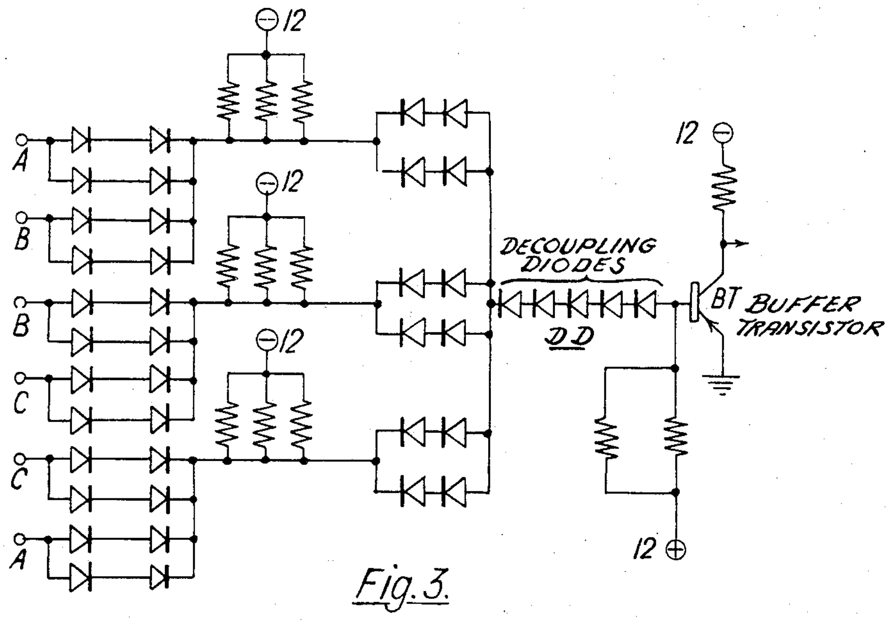
FIG. 3 shows one example of majority decision circuit which can be used in an oscillator unit.
Figure 4:
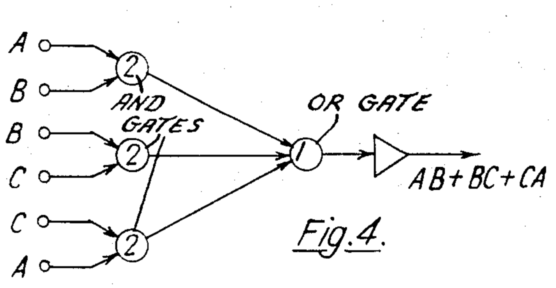
FIG. 4 represents the majority decision circuit of FIG. 3 in "logical" form.

*Majority decision circuit (FIGS. 3 and 4)*

This circuit uses conventional diode logic and consists of three two-input AND gates each fed from a pair of the master unit buffer outputs. These gates feed a buffer transistor BT via decoupling diodes such as DD, which latter function as an OR gate. Thus (see FIG. 4) the circuit is functionally three AND gates feeding on OR gate, which latter feeds a buffer. Thus the circuit does the logic operation $AB+BC+CA$.

In the interest of component security the diodes and resistors used in the gates are duplicated. Thus each AND gate input is two circuits in parallel, each of two diodes in series, so that no single diode failure can fail the gate. A similar arrangement is used for the decoupling diodes such as DD. In a similar way the supply resistors for the AND gates, and the base biassing resistors of the transistor BT are duplicated, as shown.

Similar component duplication (or, more accurately "pluralification") is used elsewhere in the circuits where it is considered desirable in the interests of component security.

In the early part of the description the use of what is in effect a two-out-of-four "majority" decision is mentioned. A similar circuit to that of FIG. 4 but designed to do the logic operation $AB+CD$ could also be used for MC, but in that case MC would have four inputs, one from each of the four units of the oscillator. Such a circuit has two AND gates, one for AB and one for CD, the outputs being applied via an OR gate via a buffer amplifier to the circuits output.

It is to be understood that the foregoing description of specific examples of this invention is made by way of example only and is not to be considered as a limitation on its scope.

What I claim is:

1. An electrical oscillation generating circuit, which includes a pulse generator which when triggered delivers an output pulse, a delay line whose input is fed from the output of said pulse generator, which delay line introduces a delay at least equal to the duration of a pulse from said generator, a connection from a tap on said delay line which, when a pulse in said delay line reaches said tap terminates the pulse input to the delay line, the time the pulse takes to reach said tap as it travels along said line being less than the duration of a pulse from said generator, so that the position of said tap determines the duration of the pulse which leaves said delay line, a feedback connection from the output of said delay line via which the pulse leaving said delay line triggers said generator to initiate the production of the next pulse from the circuit, and an output connection from the circuit.

2. A circuit as claimed in claim 1, in which said pulse generator is a monostable circuit which is set from its rest to its operated condition when triggered, and in which the monostable circuit is forcibly reset to its rest condition when the pulse in said delay line reaches said tap, said forcible reset effecting said termination of the pulse supply to said delay line.

3. A circuit as claimed in claim 1, and in which a further monostable circuit is interposed between said feedback output from the delay line and said first-mentioned monostable circuit, said further monostable circuit acting as a buffer.

4. An electrical oscillation generating arrangement, which includes three similar parallel-arranged circuit arrangements each of which includes a two-out-of-three majority decision circuit, a pulse generator fed from said majority decision circuit's output so as to deliver an output in response to a pulse from that circuit's output, a delay line fed from said pulse generator and adapted to introduce a delay at least equal to the duration of a pulse from said generator, a connection from a tap on said delay line which, when a pulse in said line reaches said tap, terminates the pulse supply to said delay line so that the position of said tap determines the duration of the pulse which leaves said delay line, and a feedback connection from the output of said delay line to an input of said majority decision circuit, in which the output of each said delay line is also connected to an input of the majority decision circuits of the other two circuit arrangements, and in which output connections are provided from one or more of said circuit arrangements.

5. An arrangement as claimed in claim 4, and in which said majority decision circuit comprises three two-input AND gates each having as its inputs the outputs from a different pair of delay lines, a three-input OR gate each of whose inputs comes from one of said AND gates, and a buffer amplifier whose input is the output of said OR gate.

6. An electrical oscillation generating arrangement which includes four similar parallel-arranged arrangements each of which includes a majority decision circuit, three of said four circuits being master and one being slave, a pulse generator fed from said majority decision's circuit's output so as to deliver an output in response to a pulse from that circuit's output, a delay line from said pulse generator and adapted to introduce a delay at least equal to the duration of a pulse from said generator, a connection from a tap on said delay line which, when a pulse in said line reaches said tap, terminates the pulse supply to the delay line so that the position of said tap determines the duration of the pulse which leaves said delay line, and a feedback connection from the output of said delay line to an input of said majority decision circuit, in which the output of each said delay line is also connected to an input of the majority decision circuits of the other three circuit arrangements, so that each said majority decision circuit has three inputs one from each of said master circuit arrangements, which inputs are respectively designated A, B, C and D, in which each said majority decision circuit performs the logical operation $AB+CD$, and in which output connections are provided from one or more of said circuit arrangements.

7. An arrangement as claimed in claim 6, and in which said majority decision circuit comprises two two-input AND gates each having as its inputs the outputs from a different pair of delay lines so that one AND gate performs the logical operation AB while the other performs the operation CD, a two-input OR gate each of whose inputs comes from one of said AND gates and whose output therefore represents the result of the operation $AB+CD$, and a buffer amplifier whose input is the output of said OR gate.

8. An arrangement as claimed in claim 7, in which said gates are rectifier gates, and in which said buffer amplifier is a transistor in the common emitter configuration.

9. An arrangement as claimed in claim 8, in which said pulse generator is a monostable circuit which is set from its rest to its on condition by the pulse from said majority decision circuit, and in which said connection from said tap extends to said monostable circuit where it causes said termination of said pulse supply by resetting said monostable circuit to its rest condition when a pulse reaches said tap.

10. An arrangement as claimed in claim 9, and which includes a further monostable circuit included between said majority decision circuit and the first-named monostable circuit, said further monostable circuit acting as a buffer for said first monostable circuit.

11. An arrangement as claimed in claim 10, and which includes a self-start circuit for the arrangement, which self start circuit includes a unit for each said parallel-arranged circuit with an output to said further monostable circuit.

12. An arrangement as claimed in claim 11, and in which each circuit's self start unit includes a free-running oscillator feeding a buffer via a normally-open gate, a majority decision circuit whose inputs come from the outputs of all of the self-start unit's buffers, an output from said majority decision circuit which forms the unit's output to the appropriate further monostable circuit, and a connection via which said gate is disabled by an output from the majority decision circuit of the appropriate one of said parallel-arranged circuits.

13. An arrangement as claimed in claim 12, and which includes a further circuit similar to said parallel-arranged circuits, but with its delay line output not connected to any of said majority decision circuits.

14. An electrical circuit unit, which includes a pulse generator which when triggered delivers an output pulse, a delay line whose input is fed from the output of said pulse generator, which delay line introduces a delay greater than the duration of a pulse from said generator a connection from a tap on said delay line which, when a pulse in said time reaches that tap terminates the pulse input to the delay line, the time the pulse takes to reach said tap as it travels along said line being less than the duration of a pulse from said generator, so that the position of said tap determines the duration of the pulse produced by the circuit, and an output connection from the output of the circuit unit.

References Cited

UNITED STATES PATENTS 3,265,975 8/1966 Kirkpatrick -------- 307—88.5

JOHN KOMINSKI, *Primary Examiner.*